SIGNAL TRANSMISSION ANALYSIS SYSTEM

Filed Nov. 12, 1963

DAVID SHEFFET,
INVENTOR.

BY HIS ATTORNEYS

Spensley & Horn

United States Patent Office 3,305,647
Patented Feb. 21, 1967

3,305,647
SIGNAL TRANSMISSION ANALYSIS SYSTEM

David Sheffet, Altadena, Calif., assignor to Western Geophysical Company of America, Los Angeles, Calif., a corporation of Delaware

Filed Nov. 12, 1963, Ser. No. 322,808
6 Claims. (Cl. 179—175.3)

This invention relates to a signal transmission analysis system and more particularly to a simplified system for comparing signals transmitted through a particular medium and like signals transmitted by other means to thereby determine the transmission characteristics of this medium.

The present invention is based upon the recognition that the signal transmission characteristics of a signal transmission medium may be determined by comparing signals that have passed through the signal transmission medium under investigation with signals that have not been subjected to this transmission medium. Thus the frequency response and phase shift characteristics of the transmission medium may be determined. Also the envelope delay and other line characteristics of the medium as for example, a long distance telephone line may be measured.

Additionally, it can then be determined whether faulty reception of signals is due to faults at the signal originating station or whether the fault lies in the transmission medium used.

In one preferred embodiment illustrating the principles of the present invention, an intercontinental telephone line may be the transmission medium whose characteristics are to be determined. A radio transmitter is placed a known distance from either end of the line, a receiver is positioned at one terminal receiving the signals from the radio transmitter and passing them through the telephone line to the other terminal, where a second receiver receives the signals directly from the radio transmitter. Signals received by these two receivers may then be compared to determine the effect the telephone transmission medium has upon the signals transmitted therethrough and to determine if subsequent corrective action is advisable.

It is therefore an object of the present invention to provide for a new and improved signal transmission analysis system.

Another object is to provide for a novel method of measuring the signal transmission characteristics of a signal transmission medium.

Another object is the provision of means and method for comparing signals passing through different transmission mediums to thereby determine the transmission characteristics of one of the transmission mediums.

For a better understanding of the present invention, reference is now had to the accompanying drawings, wherein.

Figure 1:
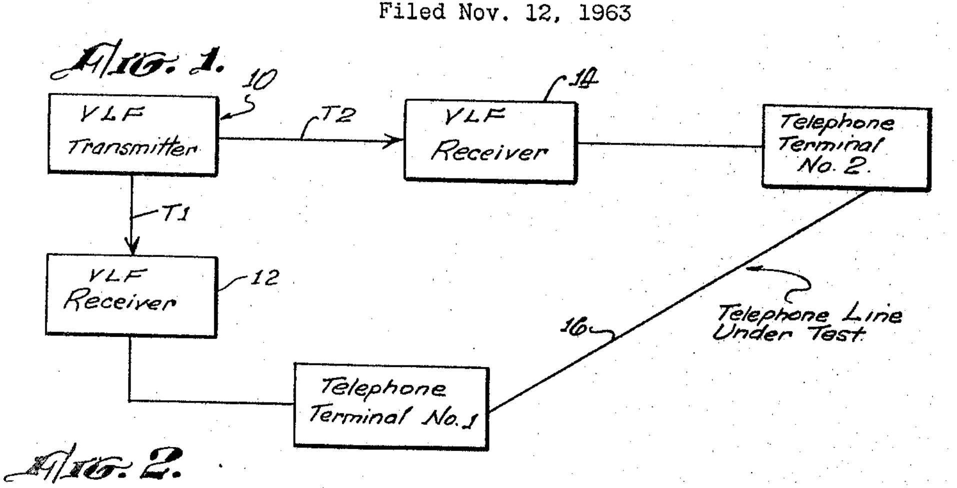
FIGURE 1 shows the system for practicing one form of the present invention.

Referring now to FIGURE 1, there is shown a very low frequency transmitter 10 that transmits in the spectrum between 10 kc. and 30 kc. In one such transmitter operated by the Navy, a frequency of 18,600 cycles of unmodulated carrier pulses may be used. It is known that VLF transmission travels in a channel between the earth's surface and the ionosphere, and that the VLF waves follow the surface of the earth and do not fluctuate appreciably in arrival time at the receiving terminal. Transmitter 10 is at a predetermined distance from the VLF receivers 12 and 14 at each end of a transmission line 16, such as a long-distance telephone line. Since the velocity of the VLF wave is 186,000 miles per second and since the distance from the transmitter 10 to each of the receivers 12 and 14 is known, the time delay due to radio transmission through space may be readily computed. The time $T_1$ may designate the time of a signal from the transmitter 10 to the VLF receiver 12 at terminal 1, and the time $T_2$ may designate the time of transmission of a signal from the transmitter 10 to the receiver 14 at terminal 2. If the pulse received at terminal 2 is then fed to the telephone line 16 where it is transmitted back to the other end at terminal 1, the time delay $T_3$ can then be computed. A comparison of the signals on a time scale will give a time differential $\Delta T$. $\Delta T$ is equal to $T_2+T_3-T_1$.

The character of the pulses received at terminal 1 directly from the VLF station 10 will be virtually unaffected by the propagating medium and will be affected mainly by the receiver characteristics and recorder characteristics. The receiver characteristics at terminal 2 will be identical to those at terminal 1 so that the signal applied to the test line 16 at terminal 2 will be identical to the signal received by air at terminal 1, but simply delayed in time because of the longer air path. In this way, the round trip signal from the VLF station at terminal 2 and back to terminal 1 via the telephone line 16 will differ from the direct VLF signal to terminal 1 by modifications caused by the filtering action of the phone line alone.

Figure 2:
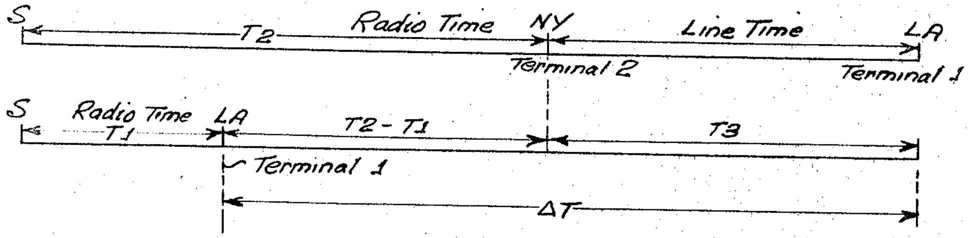
FIGURE 2 shows a time scale of the signals received directly compared with signals transmitted through the transmission medium.

Referring now to the time scale in FIGURE 2, as an example, a VLF transmitter sends out a pulse from S (Seattle) which is received by receivers at both terminal 1 (Los Angeles) in time $T_1$ and terminal 2 (New York) in time $T_2$. Assuming that Los Angeles is 1000 miles from Seattle and New York is 3000 miles away, and taking 200,000 miles per second as a round number velocity of the VLF wave, it requires 1000/200,000 seconds, or 5 milliseconds ($T_1$) for a pulse to reach terminal 1 in Los Angeles and 300/200,000 seconds, or 15 milliseconds ($T_2$), for a pulse to reach terminal 2 in New York. If the pulse receiver at New York were connected to a telephone line back to Los Angeles (whose time delay $T_3$ is to be measured) then a recorder at terminal 1 in Los Angeles would receive a first pulse directly from Seattle in 5 miliseconds, and the same pulse aagin via New York over the telephone line in 15 milliseconds, assuming no delay in the phone line. With no delay, $T_3=0$, and $T_2-T_1=\Delta T=10$ milliseconds. However, there is considerable delay in the phone line which accounts for any time difference in excess of the 10 milliseconds. This time difference may be a few milliseconds or a few hundred milliseconds, depending upon the characteristics of the particular telephone line involved.

Since a telephone line normally carries audio signals, signals within the audio range should be sent through the telephone line in order to measure its transmission response. Accordingly, the very low frequency receiver 14 in FIGURE 4 which is at telephone terminal 2 includes a beat-frequency oscillator 18 to provide for signals of the desired frequency at channel A of recorder 20. The receivers at terminals 1 and 2 are identical and at any given time the beat-frequency oscillator in each receiver is set to the same frequency so that the audio cone recorded at terminal 1 direct from the VLF station and the tone received over the teelphone line to be recorded at terminal 1 has the same fundamental frequency but will differ only in arrival time, rise time character, decay time character, relative amplitude with change of beat frequency, envelope delay and phase delay.

Figure 3:
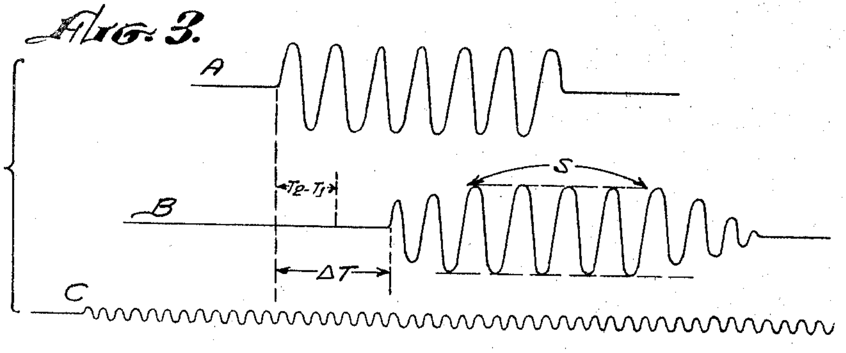
FIGURE 3 shows the waveform of signals received directly compared with signals transmitted through the transmission medium.

The character of the envelope of the pulse received directly at terminal 1 from the VLF station will be nearly rectangular, as shown by waveform A in FIGURE 3, but the pulse received over the telephone line will be considerably rounded off at the onset of the pulse and at the tailing off of the pulse, as shown by waveform B. Also, the exact shape of the envelope will vary with audio-frequency in the envelope of the pulse and the time duration of the pulse. The audio-frequency is set to identical values at any given time at each telephone terminal.

Figures 4, 5:
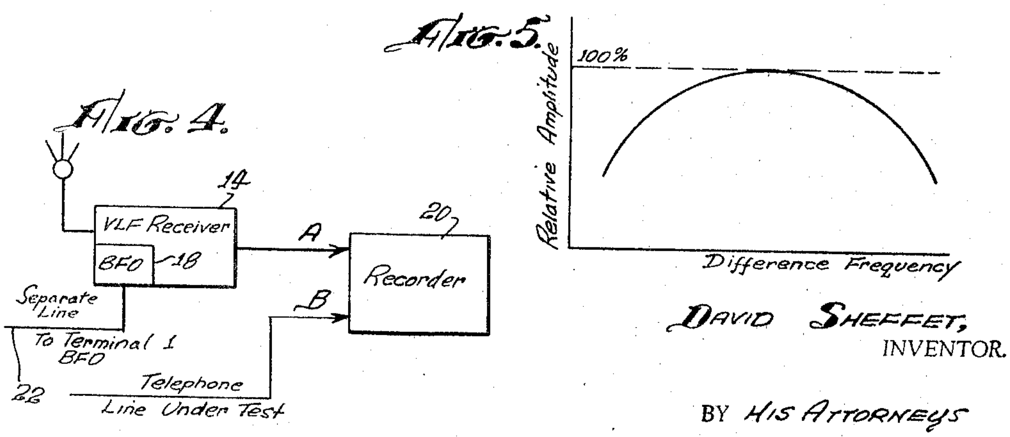
FIGURE 4 illustrates one form of phase comparing equipment.
FIGURE 5 shows a typical frequency response curve of a transmission medium.

The beat-frequency oscillator at terminal 1 should preferably by synchronized with the oscillator at terminal 2. By "beat-frequency oscillator" is meant the oscillator in the VLF receiver which produces an audio difference frequency when mixed with the VLF signal. The two-beat-frequency oscillators can be synchronized through use of a separate telephone channel, such as line 22 in FIGURE 4. There is a time delay in the telephone line for the beat-frequency oscillator signal, but the two oscillators are running continuously, so they can be kept in step with each other. To run a complete audio-frequency response curve on the phone line, it is only necessary to vary the beat-frequency oscillators in step with each other through the required frequency spectrum and record the resulting series of audio pulses created by the VLF code transmission. The amplitude of the steady state cycles in each pulse is used to plot the amplitude curve as a function of frequency. Such a frequency response curve is shown in FIGURE 5. The time lag between corresponding cycles makes possible a phase shift measurement. In FIGURE 3, wave group A represents a VLF pulse received at telephone terminal 1, as shown in FIGURE 1. This signal travels through the air as an electromagnetic pulse of, for example, 20,000 cycles. In the VLF receiver at terminal 1, the beat-frequency oscillator is set, for example, at 21,000 cycles per second, the difference frequency of 1,000 cycles being recorded on a wideband recorder 20, as shown in FIGURE 4. The top trace of the recorder will show a wave group, such as A in FIGURE 3. The envelope of this wave group is practically rectangular and is limited only by the audio-frequency cutoff point of the VLF receiver and recorder. There is no upper or lower frequency limitation in the transmitting medium between the VLF station and telephone terminal shown in FIGURE 1. The VLF signal received at telephone terminal 2 in FIGURE 1 is identical in character to wave group A of FIGURE 3, but arrives later in time at telephone terminal 2 where the VLF receiver 14 is identical to the receiver 12 at terminal 1.

The beat-frequency oscillator in the VLF receiver at terminal 2 is synchronized with the oscillator at terminal 1 so that the output frequency of the VLF receiver is the same as the output frequency of the VLF receiver at terminal 1. This output is then fed into the long-distance line 16 at terminal 2 and transmitted back to terminal 1. At terminal 1 the signal from terminal 2 is fed into the recorder and appears as trace B of FIGURE 3. Trace B is delayed in time after trace A and the time difference is measured by means of the fixed frequency timing trace C which also may be recorded on the recorder 20 from some timing circuit source (not shown).

This time delay $\Delta T$ of trace B with respect to trace A includes the time $T_2-T_1$ (which is the difference of VLF transmission time from the VLF station to terminal 2 and to terminal 1). Trace B does not have a rectangular envelope because the signal has been modified by the amplitude and phase characteristics of the telephone line. The phase characteristics are derived by measurement of the time difference between corresponding cycles of trace A and trace B, starting with the first cycle on each trace and subtracting the computed value of $(T_2-T_1)$.

It should be noted that there are more cycles in trace B than in trace A. This is caused by the upper and lower frequency attenuation in the telephone line. Also, the first few cycles and last few cycles have lesser amplitude than the cycles in the center or relatively steady-state portion of the wave envelope.

The additional cycles in trace B at the end of the pulse do not have any corresponding cycles in trace A because they were created by energy storage and discharge in the phone line acting as a band-pass filter. These additional cycles cannot be used for direct phase measurement. The whole wave group of trace B is delayed by time $\Delta T$ from the wave group of trace A. Time $\Delta T$ includes the time $T_2-T_1$ where $T_2$ is the transmission time from the VLF station to terminal 2 and $T_1$ is the transmission time from the VLF station to terminal 1. It is important to minimize $\Delta T-(T_2-T_1)$ or $T_3$ in a long-line communications system, and this method provides a means of accurately measuring the time delay in a telephone line, which in this case is $T_3=\Delta T+T_1-T_2$.

The amplitude response characteristic of the long line is measured by adjusting the synchronized beat-frequency oscillators step-by-step to as many spot frequencies as desired in the spectrum to be measured. The VLF signal amplitude (converted to waveform A in FIGURE 3) and the beat-frequency oscillator amplitude must be constant throughout the test. The amplitude of the recorded pulse B in FIGURE 3 will vary with the number of cycles per second in the pulse. The number of cycles per second in each pulse is the difference frequency or beat frequency between the adjustable beat-frequency oscillator and the VLF signal transmitted from the VLF station.

The curve showing the variation of amplitude of the steady-state portion "S" of each pulse B of FIGURE 3 with the frequency in cycles per second of the steady-state portion of the pulse will appear as in FIGURE 5. This is a measure of the frequency fidelity of the telephone line between terminal 1 and terminal 2. Sometimes a VLF transmitting station will leave the code key down and transmit a steady frequency for several minutes. When this type of signal is available, it is easy to run a response curve as in FIGURE 5. The synchronized beat-frequency oscillators are adjusted in the usual manner to a series of step frequencies and the waveforms in FIGURE 3 become two continuous sine waves displaced in time from each other and having the same frequency. The sine wave on trace A remains constant in amplitude over the constant amplitude region of the audio system of the VLF receiver. The sine wave on trace B varies in amplitude over the same frequency spectrum because of the amplitude versus frequency restriction in the long telephone line. It is this amplitude versus frequency restriction which is plotted in FIGURE 5.

The phase shift versus frequency curve is also easily plotted from the steady-state displacement of the cycles between traces A and B. Allowance must be made for the initial time difference of arrival of the VLF signal between terminal 2 and terminal 1. In the example previously shown, the VLF signal arrived at terminal 2, 10 milliseconds after its arrival at terminal 1. Therefore when measuring the time lag between trace A and trace B, 10 milliseconds of this lag is not due to the telephone line and must be subtracted from the total lag to obtain the time lag caused only by the telephone line. Furthermore, this 10 millisecond lag is independent of the audio-frequency recorded on traces A and B, because it occurs in the radio propagating medium at the frequency of the VLF signal. After the corrected time lag has been measured for each frequency, it is a simple matter to convert it to degrees of phase shift for each frequency.

The whole telephone line measuring procedure may be reversed by having the recorder at terminal 2 instead of at terminal 1. In this case the VLF signals will arrive at terminal 2 10 milliseconds after their arrival at terminal 1. The audio-frequency signals will travel in the opposite direction through the telephone line. In this case the 10 millisecond time correction would be added to the time of a cycle on trace B instead of subtracted as in the previous example. It is possible that the electrical characteristics measured on the telephone line will not be the same in one direction as in the opposite direction.

Having thus described the preferred embodiment, it is to be understood that this invention is not restricted thereto, but is to be defined in accordance with the following claims.

What is claimed is:

1. Means for measuring the signal transmission time of a signal transmission medium of known length comprising:
   - radio transmitter means for generating a signal, said radio transmitter being disposed at a predetermined distance from each end of said transmission medium and having computable times of transmission thereto,
   - radio receiver means for receiving signals received at one of said ends through said transmission medium to be compared in time with said signals at the other end of said medium whereby the time for signal transmission through said transmission medium equals the difference between the time signals which are received directly at one end of said transmission medium from said signal source and the time signals which are received at said end after being received at the other end and transmitted through said transmission medium plus the time of transmission from said source to said first end, minus the time of transmission of said signal from said source to said second end.

2. Means for measuring the signal transmission characteristics of a signal transmission medium, comprising:
   - first and second receiver means for receiving a test signal at each end of said signal transmission medium, the characteristics of which are not known and are to be determined,
   - means for generating said test signal, said means being disposed at a predetermined and known distance from each of said receiver means,
   - means for passing said test signal from said second receiver means through said signal transmission medium, and
   - means for comparing said test signal received directly by said first receiver means with said test signal passed through said signal transmission medium to thereby determine the characteristics of said transmission medium.

3. Means for measuring signal transmission characteristics of a signal transmission medium, such as a telephone line, comprising:
   - first receiver means at one end of said signal transmission medium, the characteristics of which are not known and are to be determined,
   - second receiver means for receiving a very low frequency test signal at the other end of said signal transmission medium,
   - means for propagating a very low frequency test signal through space, said means being disposed at a predetermined and known distance from each of said receiver means,
   - means for passing said test signal from said second receiver means through said signal transmission medium, and
   - means for comparing said test signal received by said first receiver means with said test signal passed through said signal transmission medium to thereby determine the characteristics of said transmission medium.

4. Means for measuring signal transmission characteristics of a signal transmission medium, such as a telephone line, comprising:

- first and second receiver means for receiving a test signal at each end of said signal transmission medium, the characteristics of which are not known and are to be determined,
   - means for propagating a very low frequency test signal through space, said means being disposed at a predetermined and known distance from each of said receiver means,
   - said receiver means being adapted to convert said test signal into a signal having a frequency normally used in said transmission medium and for which said transmission medium was intended,
   - means for passing said converted test signal from one of said receiver means through said signal transmission medium, and
   - means for comparing said converted test signals from said first receiver means with said converted test signal passed through said signal transmission medium, to thereby determine the characteristics of said transmission medium.

5. Means for measuring a signal transmission medium response to an audio frequency band of signals comprising:
   - first and second receiver means receiving test signals at each end of said signal transmission medium, the characteristics of which are not known and are to be determined,
   - means for propagating very low frequency test carrier signals through space, said means being disposed at a predetermined and known distance from each of said receiver means,
   - said receiver means being adapted to convert said signals into an audio frequency band of signals,
   - means for passing said audio frequency band of signals from one of said receiver means through said signal transmission medium, and
   - means for comparing said audio frequency band of signals from said first receiver means with the audio frequency band of signals passed through said signal transmission medium, to thereby determine the characteristics of said transmission medium.

6. Means for measuring signal transmission characteristics of a signal transmission medium, such as a telephone line, comprising:
   - first and second receiver means for receiving said test signal at each end of said signal transmission medium, the characteristics of which are not known and are to be determined,
   - means for generating and transmitting a very low frequency test signal through space, said means being disposed at a predetermined and known distance from each of said receiver means,
   - said receiver means converting said very low frequency signal to an audio signal,
   - means passing said audio signal from one of said receiver means through said signal transmission medium, and
   - recording means for comparing said audio signal received by one of said receiver means with said audio signal passed through said signal transmission medium for analysis of the audio signal response of said transmission medium, to thereby determine the characteristics of said transmission medium.

References Cited by the Examiner

UNITED STATES PATENTS

| | | | |
|---|---|---|---|
| 2,527,548 | 10/1950 | Hastings | 343—9 |
| 2,690,558 | 9/1954 | Harvey. | |
| 2,907,400 | 10/1959 | Swafford. | |

KATHLEEN H. CLAFFY, *Primary Examiner.*

S. J. BOR, R. MURRAY, *Assistant Examiners.*